United States Patent [19]

Deprez

[11] 4,198,185
[45] Apr. 15, 1980

[54] METALWORKING APPARATUS HAVING IMPROVED MEANS FOR SUPPORTING AND GUIDING AN ENDLESS CHAIN

[75] Inventor: Thomas A. Deprez, Rochester, N.Y.

[73] Assignee: The Gleason Works, Rochester, N.Y.

[21] Appl. No.: 950,908

[22] Filed: Oct. 12, 1978

[51] Int. Cl.² .......................................... B23D 37/18
[52] U.S. Cl. .................................. 409/262; 409/59; 51/136
[58] Field of Search ................. 90/3, 9, 10, 78, 22, 90/82, 95; 51/136; 74/242.8; 198/813, 838

[56] References Cited

U.S. PATENT DOCUMENTS 2,080,464  5/1937  Doan ................... 90/78 X
2,838,980  6/1958  Babcock ................... 90/78

FOREIGN PATENT DOCUMENTS 380404  7/1973  U.S.S.R. ................... 90/78

*Primary Examiner*—Gil Weidenfeld
*Attorney, Agent, or Firm*—Morton A. Polster; Ralph E. Harper

[57] ABSTRACT

An endless chain for carrying stock removal tools is provided with two sets of rollers for supporting and guiding the chain around a chain housing. One set of rollers functions to guide the chain through the work zone portion of its travel while the second set of rollers functions to guide the chain through non-work zone portions of its travel.

10 Claims, 6 Drawing Figures

METALWORKING APPARATUS HAVING IMPROVED MEANS FOR SUPPORTING AND GUIDING AN ENDLESS CHAIN

BACKGROUND AND BRIEF DESCRIPTION OF THE INVENTION

It is known in the art of broaching to provide for machines which utilize an endless chain for carrying a series of tools into contact with one or more workpieces. Typically, the endless chain is assembled from a plurality of articulated links, and the machine includes a housing for supporting the assembled endless chain and for defining a path of travel passing through a work zone where stock removal tools, carried by the articulated links, can engage the work as the endless chain is driven through the work zone. Examples of early machine designs of this type for producing spiral and helical gears are disclosed in U.S. Pat. Nos. 1,468,393; 1,469,602; 2,475,690; 2,692,537; and 2,749,804. Additionally my copending U.S. patent applications Ser. No. 930,252 and Ser. No. 930,779, both filed Aug. 2, 1978, disclose improvements in endless chain assemblies for machines of this type.

Machines utilizing an endless chain for carrying tools offer a potential for very high speed production of whatever shape of workpiece is being formed by the tools. In fact, in the case of gear production, it is contemplated that stacks of gear blanks may be worked simultaneously with machinery of this type, rather than one at a time as has been the case with many other types of gear forming machines. However, the requirements for gear manufacture are far more severe than those for other forms of broaching, and therefore, machines of the endless chain type have not been, as far as I know, commercially acceptable for high production gear manufacturing needs up to this time. The forming of gear tooth profiles on a work blank requires precise control of an engagement between a workpiece and each cutting tool making contact with the workpiece. This requirement demands, in turn, a very rigid machine which maintains precise placement of both workpiece and tool under a working load and for a sustained operation of the machine. Since an endless chain is by its very nature not as rigid as other forms of tool-holding equipment, it has been a problem in this art to design and manufacture an endless chain type of machine having the capability of high production manufacture of precision gears.

In my copending U.S. patent applications (identified above), I describe an improved type of endless chain apparatus in which the endless chain is firmly supported and carefully guided in its advancement through the critical work zone portion of its path of travel. This was partially accomplished by providing a supporting surface in the bed of the chain housing for firmly supporting the endless chain as its links were driven through the work zone area. In addition, gib means were carried adjacent the work zone for overlapping and pressing the endless chain into firm contact with the supporting surface, and this was done through a contact of the gib means with a pair of rollers carried by each link of the endless chain. As the endless chain entered the work zone portion of its travel, the rollers associated with the link were pressed toward the supporting surface of the chain housing by their rolling contact with the overlapping gib means carried along each edge of the work zone. This action, in turn, pressed the entire link toward the supporting surface in the bed of the chain housing.

As each link advanced out of the work zone, its rollers became disengaged from the gib means and shifted their contact to guide surfaces provided throughout the remainder of the path of travel of the endless chain. This shifting from the gib means to the separate guide surfaces required a reversal of rotation of the pair of rollers associated with each link. Although such reversal in rotation is acceptable for many uses of this type of machine, there is a potential problem of unwanted wear taking place between the rollers and the guide surfaces which they contact in their course of travel from the work zone through the remainder of the chain housing.

In order to overcome any problems that may be associated with the guiding rollers of an endless chain, the present invention provides for two separate sets of rollers carried by the links of the endless chain for separately contacting the gib means (in the work zone) and the guiding surfaces (out of the work zone). The first set of rollers is carried in positions for contacting only the gib means as the endless chain is pressed into firm contact with the supporting surface of the chain housing in the work zone area of the machine. These rollers normally rotate only in the direction required for rolling contact with the gib means for advancement through the work zone. The second set of rollers is carried in positions which are out of contact with the gib means but which make rolling contact with the guide surfaces of the machine for all of the path of travel of the chain outside of the work zone area. The second set of rollers rotates only in a direction required for rolling engagement with the guide surfaces. Thus, the two sets of rollers can rotate in opposite directions at different times in the course of travel of the chain throughout its entire path of travel, and there is no requirement for a reversal of rotation of either set of rollers in whatever contact is being made with either the gib means or the guide surfaces of the machine. This provides for better control and support of the endless chain throughout its travel and eliminates the potential for unwanted wear of moving components which might otherwise be required to change direction of rotation very rapidly during the course of travel of the endless chain.

In accordance with a specific embodiment of the invention, each link making up the endless chain assembly is provided with a first pair of rollers mounted on opposite sides of the link for making rolling contact only with gib means associated with the apparatus. In addition, a second pair of rollers is mounted on opposite sides of the link for making rolling contact only with the guide surfaces associated with the apparatus. The first and second pairs of rollers are mounted on a common axis provided by separate shafts carried on opposite sides of the link for supporting the rollers. Each separate shaft supports one roller of the first pair and one roller of the second pair in a side-by-side relationship.

In order to further improve the rolling contact between the guiding rollers of the endless chain and the structures with which they make contact, there is optionally provided a means for initiating the rotation of the second set of rollers as the rollers leave the work zone area of the machine and before they make a full load bearing contact with the guide surfaces provided in the remainder of the machine. The means for initiating rotation comprises strips of relatively soft or resilient material which make initial contact with the rollers for the purpose of imparting a rotational moment thereto without engaging the rollers in a full load-bearing contact with the harder material of the guide surfaces which they ultimately contact. The softer material may comprise a strip of plastic or soft metal, and the strip may be of a configuration which provides for a diminishing contact between the roller and the strip as the roller advances toward a full contact with an associated guide surface.

These and other features and advantages of the present invention will become apparent in the more detailed discussion which follows, and in that discussion reference will be made to the accompanying drawings as briefly described below.

DETAILED DESCRIPTION OF INVENTION

Figure 1:
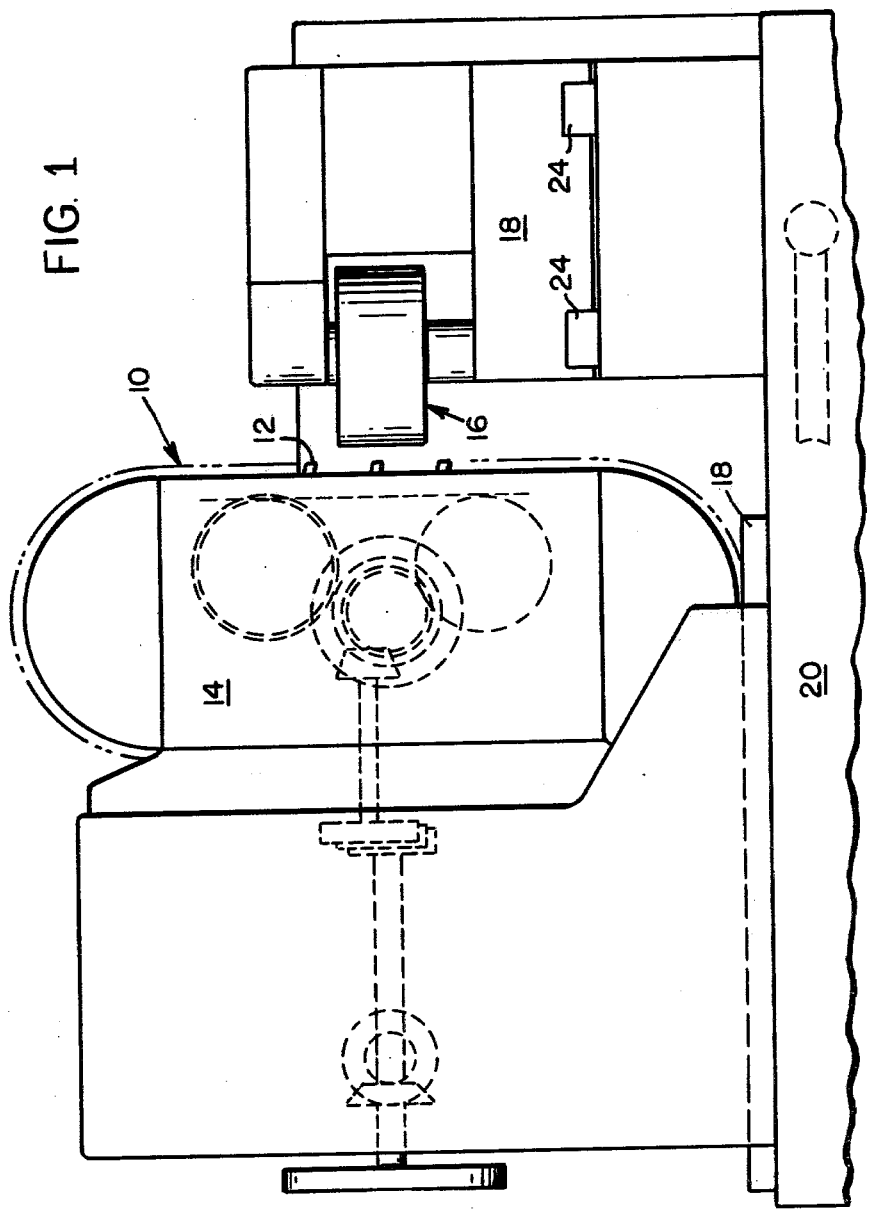
FIG. 1 is a side elevational view of the type of apparatus being improved upon by the present invention.
Figure 2:
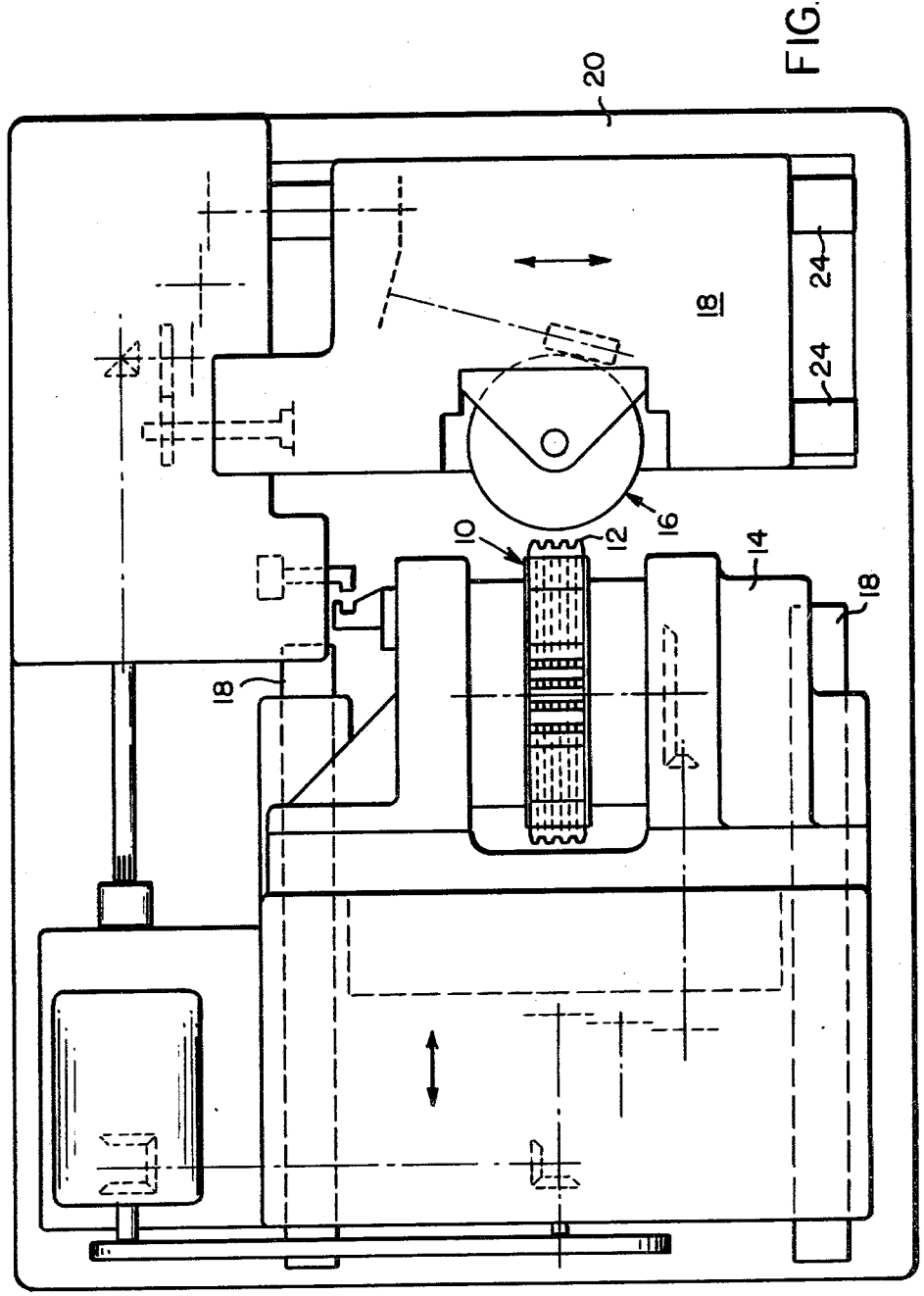
FIG. 2 is a top plan view of the same apparatus shown in FIG. 1.

FIGS. 1 and 2 illustrate the type of metalworking apparatus contemplated by the present invention. The illustrated apparatus is intended for gear manufacturing applications and includes an endless chain 10 made up of a series of articulated links for carrying stock removing tools 12. The stock removing tools 12 may be in the form of cutting or grinding tools and may be arranged in one or more rows around the entire circumference of the endless chain 10. FIG. 1 shows the endless chain mounted in a vertical orientation around a housing 14 for being advanced toward and away from one or more workpieces 16 (workpieces may be manufactured one at a time or may be stacked and manufactured in multiple numbers). Movement of the housing 14 takes place on ways 18 carried on a base 20 of the machine. At the work station end of the machine, the workpieces 16 are removably mounted on a spindle carried in a housing 22. The housing 22 is mounted on ways 24, and known means are provided for translating the housing 22 and its retained workpieces 16 relative to the stock removing tools 12.

Details of the apparatus may vary widely in accordance with known design features for such machines. For example, the endless chain may be arranged in a horizontal orientation rather than the vertical one which is shown. Loading and unloading devices may be provided for moving workpieces into and out of the work station area, and it would be possible to provide for translation of the endless chain itself relative to a fixed position of the workpieces, if desired. In addition, known means are provided for tilting the housing 14 and its contained endless chain 10 for setting a helix angle for the manufacture of helical gears.

Figure 3:
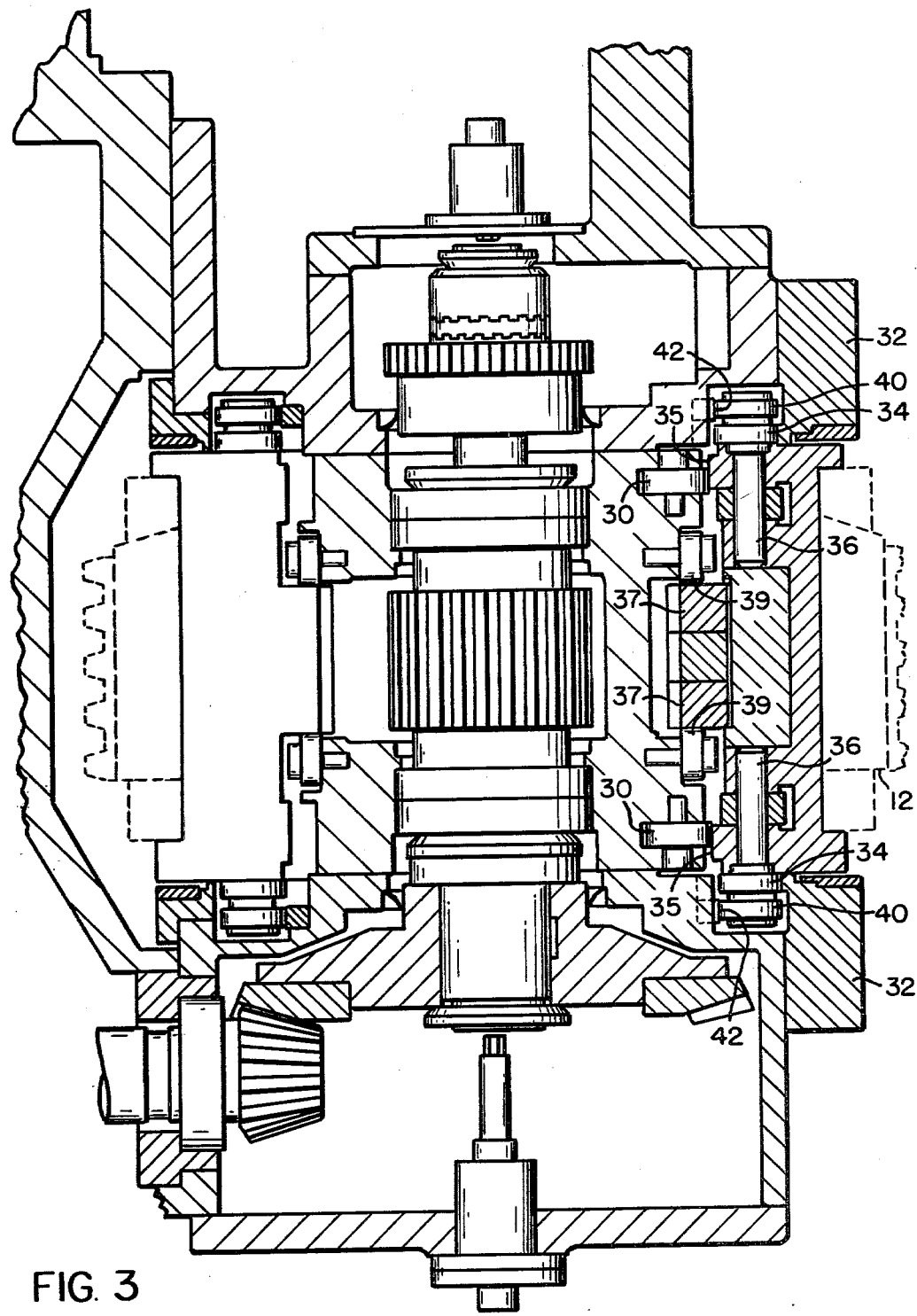
FIG. 3 is a cross sectional view, in greatly enlarged scale, of a section of an endless chain and its associated structures as seen on line 3—3 of FIG. 6.

FIG. 3 illustrates structural details of the improved endless chain of this invention, as seen in a cross section which includes the work zone area where stock removal tools of the endless chain are engaging one or more workpieces (the portion of the chain which is in the work zone is that portion appearing to the right of the FIG. 3 view). In the work zone portion of its travel, the individual links of the endless chain are pressed into firm contact with a supporting surface made up of two rows of rollers 30 (see also FIG. 4) carried in a bed portion of the housing 14. Firm contact with the supporting surface is attained through the use of gib means 32 for pressing against a first set of rollers 34 carried by each link of the endless chain. As further illustrated in FIG. 4, the gib means 32 comprise a pair of parallel members fastened along opposite edges of the endless chain so as to overlap and contact the first set of rollers 34 only in the work zone area. The first set of rollers 34 are mounted for rotation on two separate shafts 36 carried on a common axis of each link of the endless chain, and thus, the entire link body is pressed into contact with the supporting rollers 30 when the rollers 34 advance beneath the parallel gib means 32 in the work zone portion of the travel of the endless chain. FIG. 3 also shows the cross-sectional shape of each link as including a bottom bearing surface 35 for contacting the supporting rollers 30. In addition a depending portion 37 of each link is shaped to contact rollers 39 which function to prevent side-to-side motion of the chain as it moves through the work zone. The descriptions so far are similar to those included in my copending patent applications (identified above), and reference can be made to those applications for a more complete understanding of other structures shown in FIG. 3 which are not relevant to an understanding of the specific invention of this application.

Figure 4:
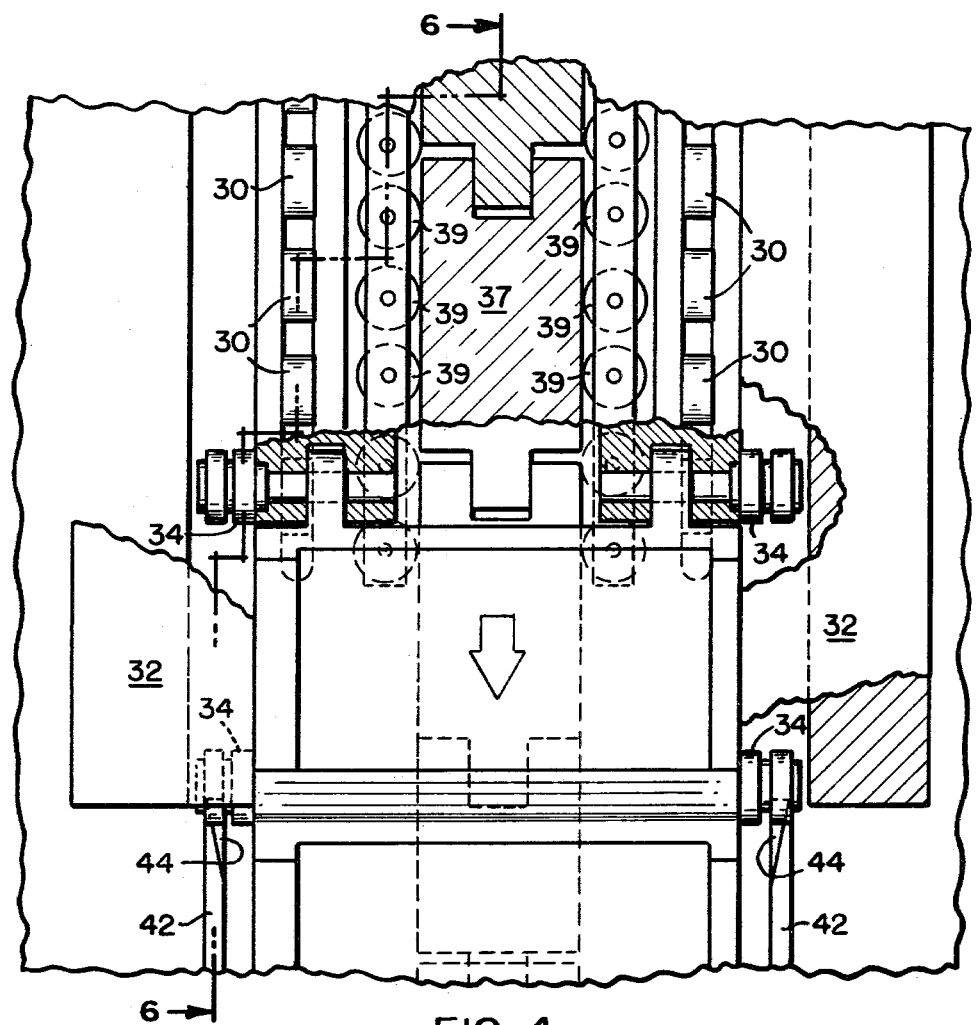
FIG. 4 is a plan view of a portion of the endless chain of FIG. 3 as seen on line 4—4 of FIG. 6.
Figure 5:
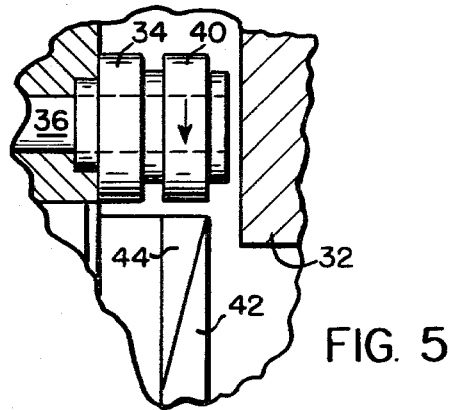
FIG. 5 is an enlarged view of just a portion of the assembly shown in FIG. 4.
Figure 6:
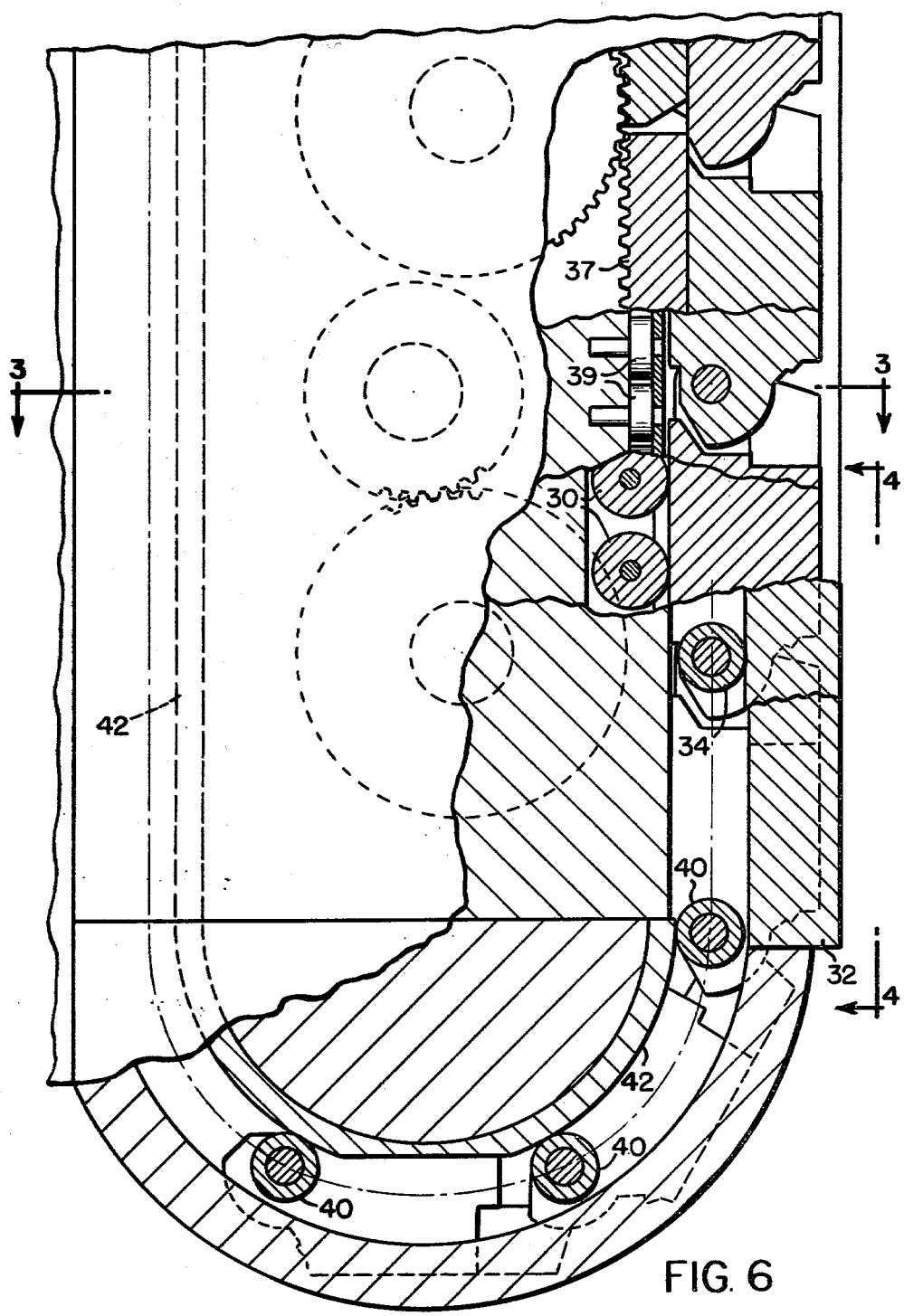
FIG. 6 is a side view, in section, of a portion of the endless chain, as seen on line 6—6 of FIG. 4.

In accordance with the present invention, each link of the endless chain is provided with a second set of rollers 40 for supporting and guiding the individual links when they are out of the work zone portion of their travel. In the illustrated embodiment, the second set of rollers are mounted for rotation on the same shafts 36 that carry the first set of rollers 34. Thus, the two sets of rollers for each link are mounted on a common axis and can rotate relative to each other as well as relative to the shafts 36 upon which they are mounted. The first set of rollers 34 and the second set of rollers 40 have separate functions inasmuch as the rollers 34 of the first set are engaged only when they are passing through the work zone area of the machine, while the rollers 40 engage guide surfaces provided in the housing 14 only when they are out of the work zone portion of the chain travel. Also, the separate sets of rollers rotate in opposite directions from each other. By shifting supporting functions from one set of rollers to another, it is possible to avoid the problem of a single set of rollers for each link having to reverse rotation as they enter or exit from the work zone area of the machine as a result of their contact with the gibs 32. As shown in FIGS. 4, 5 and 6, each link advances through the work zone portion of the machine and then its rollers 34 move out of contact with the gib means 32 as its rollers 40 engage a guide surface 42. The guide surface 42 extends around both ends and along the back side of the chain housing. The guide surface 42 comprises a hardened rail, or similar structure which is shaped to guide the chain around the ends of the chain housing where the individual links must follow a curved path in order to provide for a return of the chain back to its starting point. It has been found that the curved path portion of the chain travel is very important and that the curve of the path should be non-circular in order to accommodate the articulated links making up the endless chain. The non-circular path is designed to assure constant velocity of the chain as it advances around the entire housing.

As the rollers 40 are exiting from the work zone area of the machine, they make contact with the guide surfaces 42 provided on each side of the chain housing. As contact is made, the rollers 40 start rotating. It is desirable, in certain applications, to optionally provide for a means for initiating rotation of these rollers 40 before full engagement with the hardened guide surfaces 42 is achieved. This can be done in the manner shown in FIG. 5 wherein a strip of softer material 44 (such as a softer metal or even a suitable plastic material) is provided for making initial contact with the rollers 40 before they are in full contact with the very hard surfaces of the guide surfaces 42. As shown in FIG. 5, the strip of softer material 44 may be shaped to provide for diminishing contact with the roller 40 as the roller advances out of the work zone area and into full contact with the guide surface 42. A similar means for initiating rotation may be provided on the roller-engaging surfaces of the gib means 32, at the entry end of the work zone area, for initiating the rollers 34 as they enter the work zone.

Thus, the invention provides for dual bearing means, in the form of two separate sets of rollers, carried by an endless chain for making separate contacts with gib means and guiding surfaces, respectively, as the endless chain travels around a housing. Although the invention has been described and discussed with reference to a specific embodiment only, equivalent designs are intended to be included within the scope of protection sought herein as defined in the claims which follow.

I claim:

1. Metalworking apparatus of the type which includes an endless chain assembled from a plurality of articulated links and which further includes a housing for supporting the endless chain and for defining a path of travel passing through a work zone where stock removal tools carried by the articulated links can engage one or more workpieces as the endless chain is driven through the work zone, characterized by
   a supporting surface in said work zone area of the housing firmly supporting the endless chain as portions of the endless chain are driven through the work zone,
   gib means carried adjacent said work zone for pressing the endless chain into firm contact with said supporting surface as the endless chain advances through the work zone part of its travel,
   guide surfaces provided in said housing guiding the endless chain in its travel into and out of the work zone,
   a first set of rollers carried by the endless chain in positions for contacting said gib means so that the endless chain is pressed into firm contact with said supporting surface as said first set of rollers advances into rolling contact with the gib means, and
   a second set of rollers carried by the endless chain in positions which prevent contact of the second set of rollers with the gib means but which provide for rolling contact with said guide surfaces, the relationship of said first set of rollers to said gib means and of said second set of rollers to said guide surfaces being such that the rollers of said first set of rollers rotate in one direction as they make rolling contact with the gib means while the rollers of the second set of rollers rotate in an opposite direction as they make contact with said guide surfaces, to thereby eliminate the need for any given set of rollers to reverse direction of rotation while being carried along an endless path of travel in the apparatus.

2. The apparatus of claim 1 wherein said gib means comprise a pair of parallel members fastened along opposite edges of said endless chain so as to overlap said first set of rollers carried by the endless chain.

3. The apparatus of claim 1 wherein said supporting surface in said work zone includes a number of supporting rollers for firmly backing the endless chain as it moves through the work zone.

4. The apparatus of claim 1 wherein said first and second sets of rollers are mounted on two separate shafts carried on a common axis of each link of said endless chain with one roller of the first set and one roller of the second link being mounted in a side-by-side relationship on each separate shaft.

5. The apparatus of claim 1 wherein said guide surfaces do not extend through said work zone portion of the path of travel for the endless chain, and including means for initiating rotation of said second set of rollers before they make full load-bearing contact with said guide surfaces.

6. The apparatus of claim 1 wherein said guide surfaces include curved portions at each end of said housing and wherein said curved portions define non-circular paths of travel for the endless chain.

7. In apparatus of the type which includes an endless chain assembled from a plurality of articulated links for carrying stock removal tools into and out of contact with one or more workpieces, and having a work zone which includes a supporting surface for supporting the endless chain as the chain passes through the work zone, the improvement in each of said links comprising
   a first pair of rollers carried by the link and making rolling contact in a first direction of rotation with gib means arranged along the work zone of the apparatus in which the endless chain is assembled, and
   a second pair of rollers carried by the link and making rolling contact in an opposite direction of rotation than said first direction of rotation of said first pair of rollers, said second pair of rollers being arranged to make contact with guide surfaces defining a path of travel for the endless chain into and out of the work zone of the apparatus in which the endless chain is assembled.

8. The improvement of claim 7 wherein said first and second pairs of rollers are mounted on a common axis.

9. The improvement of claim 8 wherein separate shafts are carried on the link for supporting one roller of said first pair and one roller of said second pair on each of said separate shafts.

10. The improvement of claim 7 wherein each link includes a bottom bearing surface for contacting said supporting surface in said work zone.

* * * * *